(No Model.)

A. R. SEWELL.
BICYCLE LOCK.

No. 584,017. Patented June 8, 1897.

WITNESSES
C. Gerst.
John Buckler.

INVENTOR
Augustus R. Sewell.
BY
Edgar Tate
ATTORNEYS.

UNITED STATES PATENT OFFICE.

AUGUSTUS R. SEWELL, OF DETROIT, MICHIGAN.

BICYCLE-LOCK.

SPECIFICATION forming part of Letters Patent No. 584,017, dated June 8, 1897.

Application filed January 22, 1897. Serial No. 620,190. (No model.)

*To all whom it may concern:*

Be it known that I, AUGUSTUS R. SEWELL, a citizen of the United States, residing at Detroit, in the county of Wayne and State of Michigan, have invented certain new and useful Improvements in Locks for Bicycles and Similar Vehicles, of which the following is a full and complete specification, such as will enable those skilled in the art to which it appertains to make and use the same.

This invention relates to locks for bicycles and similar vehicles; and the object thereof is to provide an improved device of this class by means of which both wheels of the bicycle may be securely locked whenever desired; and with this and other objects in view the invention consists in the construction, combination, and arrangement of parts hereinafter described and claimed.

The invention is fully disclosed in the following specification, of which the accompanying drawings form a part, in which—

Figure 1:
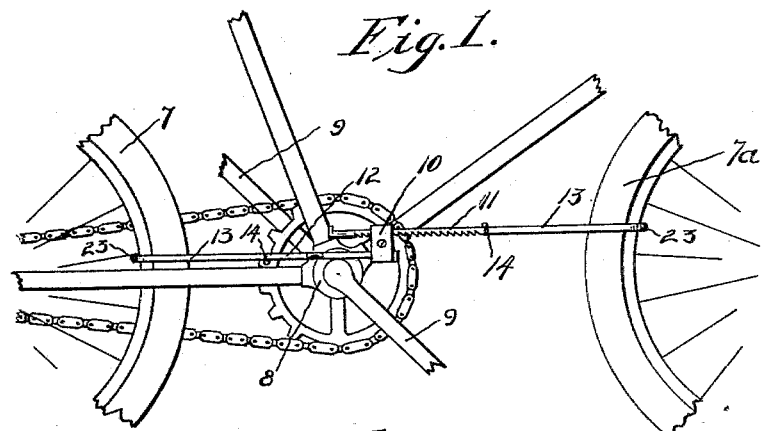
Figure 2:
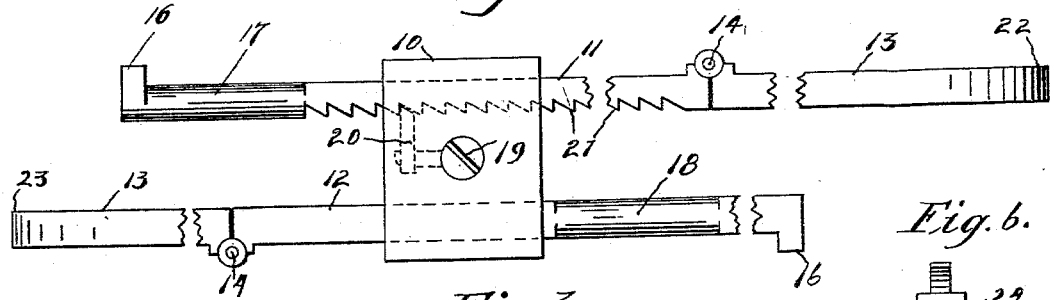
Figure 3:
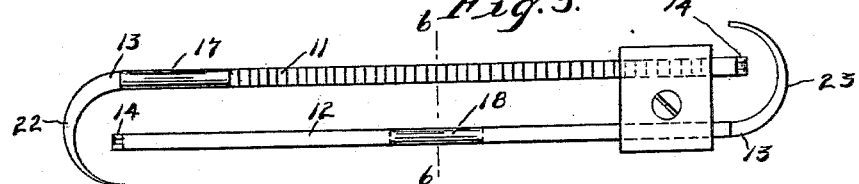
Figure 4:
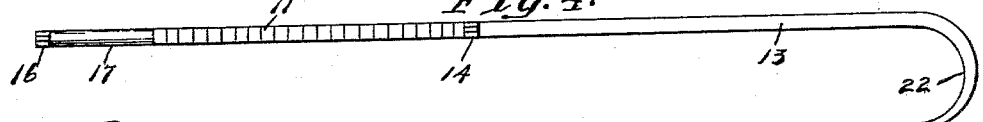
Figure 5:
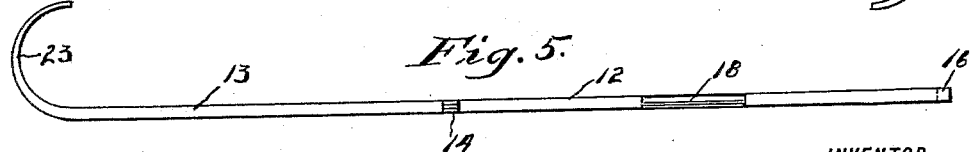

Figure 1 is a side view of a portion of a bicycle, showing the application of my improved lock; Fig. 2, a side view of the lock detached and on an enlarged scale; Fig. 3, a similar view showing the manner of holding the separate parts of the lock together. Figs. 4 and 5 are plan views of separate locking-bars which form a part of the lock, said bars being detached from the casing of the lock in connection with which they are used; and Fig. 6, a section on the line 6 6 of Fig. 3.

In the drawings forming part of this specification the separate parts of my improvement are designated by the same numerals of reference in each of the views, and in said drawings I have shown at 7 a part of the drive-wheel of a bicycle or similar vehicle, and at 7ª a part of the guide-wheel, and between the wheels 7 and 7ª are shown the support 8 of the pedal-shaft and the pedal-cranks 9, connected with said shaft, and in the practice of my invention I provide a lock which comprises a box or casing 10, which is preferably rectangular in form and through which are passed two locking-bars 11 and 12, each of which is provided with a hinged section 13, said hinged sections being connected with said locking-bars at 14 by means of hinges, as clearly shown in Fig. 1.

The locking-bars 11 and 12 are provided at the ends thereof opposite the hinge 14 with shoulders or projections 16, and said ends project through the box or casing 10 in opposite directions, and the locking-bar 11 adjacent to the shoulder or projection 16 is round for a portion of its length, as shown at 17, whereby it may be turned in the casing 10, and the locking-bar 12 is also provided with a round portion 18 for a similar purpose.

The box or casing 10 is provided with a keyhole 19, and mounted therein is a locking device of any desired form or construction, part of which is shown in dotted lines at 20, and said locking device is adapted to be operated by a key and is also adapted to operate in connection with ratchet-teeth 21, formed on the bottom of the locking-bar 11.

Figure 6:
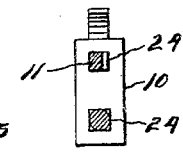

The hinged section 13 of the locking-bar 11 is provided with a hook 22, which is adapted to engage with the rim of one of the wheels, as shown in Fig. 1, and the hinged section 13 of the locking-bar 12 is provided with a corresponding hook 23, which is adapted to engage with the tire of the other wheel, and the holes or openings in the box or casing 10, through which the bars 11 and 12 are passed, are rectangular in form, as shown at 24 in Fig. 6, and the main portions of said bars are also rectangular in cross-section, and the operation will be readily understood from the foregoing description when taken in connection with the accompanying drawings and the following statement thereof.

When the locking-bars are in position for locking the vehicle, the ratchet-teeth on the bar 11 project downwardly and the hooks 22 and 23 project transversely of the rims of the wheels, and the hinged sections of the said bars are swung into line with the main portions thereof, and the bar 12 is passed through the casing until the lugs or projections 16 strike the side thereof, after which the bar 11 is forced into the casing in the opposite direction as far as it will go, the hooks 22 and 23 being connected with the tires of the wheels, and the lock within the box or casing 10 is operated to hold the bars in this position, and in this position of the lock the wheels of the vehicle will be securely held and cannot be operated, and in order to unlock the device the key must be inserted into the box or casing.

Any suitable form of lock may be placed in the box or casing, and my invention is not limited thereto, and it will be apparent that changes in and modifications of the construction herein described may be made without departing from the spirit of my invention or sacrificing its advantages.

In order to fold the separate parts of the lock so as to put the same in the pocket, the locking-bars 11 and 12 are adjusted in the box or casing 10 so that they may be turned on their cylindrical portions 17 and 18, and when this is done the hinged sections 13 may be folded parallel or adjacent to the main portions 11 and 12 of the locking-bars, and in this position of the parts the hooks 22 and 23 will be in the same plane as said bars and said box or casing. This position of the parts of the lock is shown in Fig. 3, and the device when thus folded may be conveniently carried in the pocket, as will be readily understood.

Having fully described my invention, I claim as new and desire to secure by Letters Patent—

1. A lock for bicycles and similar vehicles, the same comprising a box or casing, locking-bars which are longitudinally movable therein, the opposite ends of said bars being provided with a hinged section, each of which is provided with a hook, and said bars being adapted to be adjusted in said box or casing, and to be locked in the desired position therein, substantially as shown and described.

2. A lock for bicycles and similar vehicles, comprising a box or casing, two longitudinally movable and parallel locking-bars mounted therein, one of which is provided with ratchet-teeth, said bars being provided at their opposite ends with a hinged section, each of which is provided with a hook, and said box or casing being also provided with a key-operated lock, which is adapted to operate in connection with the ratchet-teeth on one of said bars, substantially as shown and described.

3. A lock for bicycles and similar vehicles, comprising a box or casing, two longitudinally movable and parallel locking-bars mounted therein, one of which is provided with ratchet-teeth, said bars being provided at their opposite ends with a hinged section, each of which is provided with a hook, and said box or casing being also provided with a key-operated lock, which is adapted to operate in connection with the ratchet-teeth on one of said bars, said bars being also cylindrical in form for a portion of their lengths, and each being provided at the end thereof, opposite the hinged extension with a lug or projection, substantially as shown and described.

In testimony that I claim the foregoing as my invention I have signed my name, in presence of the subscribing witnesses, this 18th day of January, 1897.

AUGUSTUS R. SEWELL.

Witnesses:
A. A. BENTLEY,
AMOST FOSTER.